Sept. 12, 1967  J. L. A. SEE  3,340,781
CHAIN GRIDS FOR RUNWAYS AND MUTUAL LOCKING
ELEMENTS FOR FORMING THE SAME
Filed Aug. 2, 1965  4 Sheets-Sheet 2

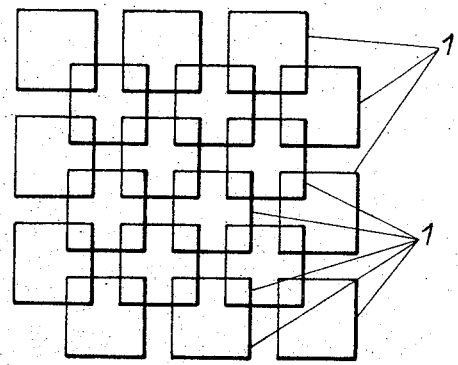
Fig.1
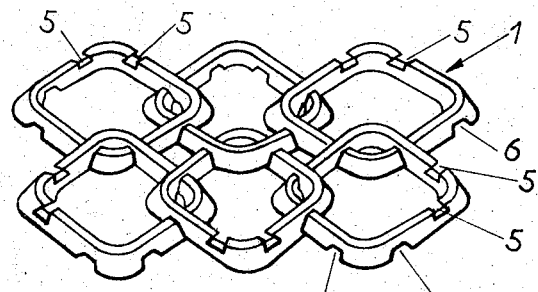
Fig.2
Fig.3
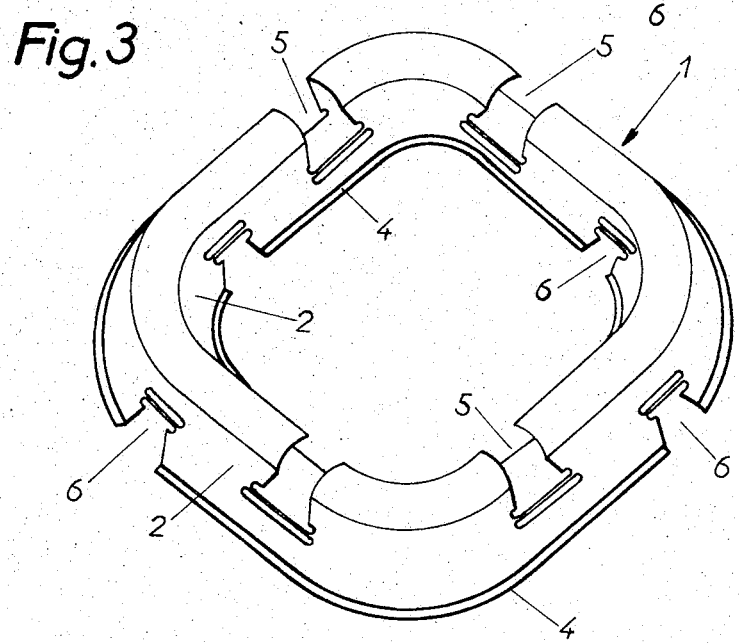
INVENTOR
JACQUES L. A. SEE
BY

INVENTOR
Jacques L. A. See

INVENTOR
JACQUES A. L. SEE

Sept. 12, 1967 J. L. A. SEE 3,340,781
CHAIN GRIDS FOR RUNWAYS AND MUTUAL LOCKING
ELEMENTS FOR FORMING THE SAME
Filed Aug. 2, 1965 4 Sheets-Sheet 4

INVENTOR
JACQUES L. A. SEE
BY

United States Patent Office 3,340,781
Patented Sept. 12, 1967

3,340,781
CHAIN GRIDS FOR RUNWAYS AND MUTUAL LOCKING ELEMENTS FOR FORMING THE SAME
Jacques Leon Alexandre See, 54 Rue la Bruyere, Paris 9, France
Filed Aug. 2, 1965, Ser. No. 476,332
Claims priority, application France, Aug. 5, 1964, 984,292, Patent 1,447,952
7 Claims. (Cl. 94—13)

ABSTRACT OF THE DISCLOSURE

Resilient rings interlocked in corner-to-corner relation to form a grid. Alternate corners of each ring are provided with upper and lower recesses bounded by notches and each recess having beads along its base to snap fit within cooperative notches.

---

The present invention relates to a new grid for runways simply and rapidly made able to be utilized for numerous purposes such as the making of an artificial sliding track for ski practice, making trays, gratings, etc.

The particular design of the grid according to the invention enables it to assume the exact shape of awkward surfaces, which is particularly advantageous for forming ski runs. Moreover, this design makes it also possible easily and rapidly to change the elements forming the grid.

According to the invention, the grid is formed by identical rings arranged in alternate rows and overlapping each other by means of notches ensuring mutual locking, these notches, defined by pairs alternating from the top surface of the bearing surface of each ring, being respectively bordered on either side by a small horizontal bar forming a supporting and vertical locking element.

Various other characteristics of the invention will moreover be revealed by the detailed description which follows.

Forms of embodiment of the object of the invention are shown, by way of non-restricting examples, in the attached drawings.

FIGURE 1 is a flat diagrammatical view showing part of a grid according to the invention.

FIGURE 2 is a diagrammatical perspective showing, on a larger scale, the arrangement of the elements forming the grid, but not showing the flush arrangement in order to better illustrate the interlocking fit.

FIGURE 3 is a perspective, on a larger scale, of one of the forming elements.

According to the first form of embodiment shown in FIGS. 1 to 8, a grid for runways according to the invention is formed by identical rings 1 which are overlapping on one another to form a continuous sheet corresponding to the surface to be protected. According to this example, each ring forms a quadrilateral with rounded corners, with an inverted U-section defined by two peripheric walls 2 converging towards an upper convex surface 3. Edges 4 turned down outside extend the walls 2 to form bearing components and for support imparting good stability to each ring.

The rings can be made of any suitable material, but it has been found advantageous to make them by moulding of suitable plastic material. The kind of this material is selected for possessing, in addition to a certain facility of elastic distortion, other qualities, such as stability, ageing, resistance to relatively high and low temperatures, qualities which obviously can vary according to the purposes sought.

Figure 4:
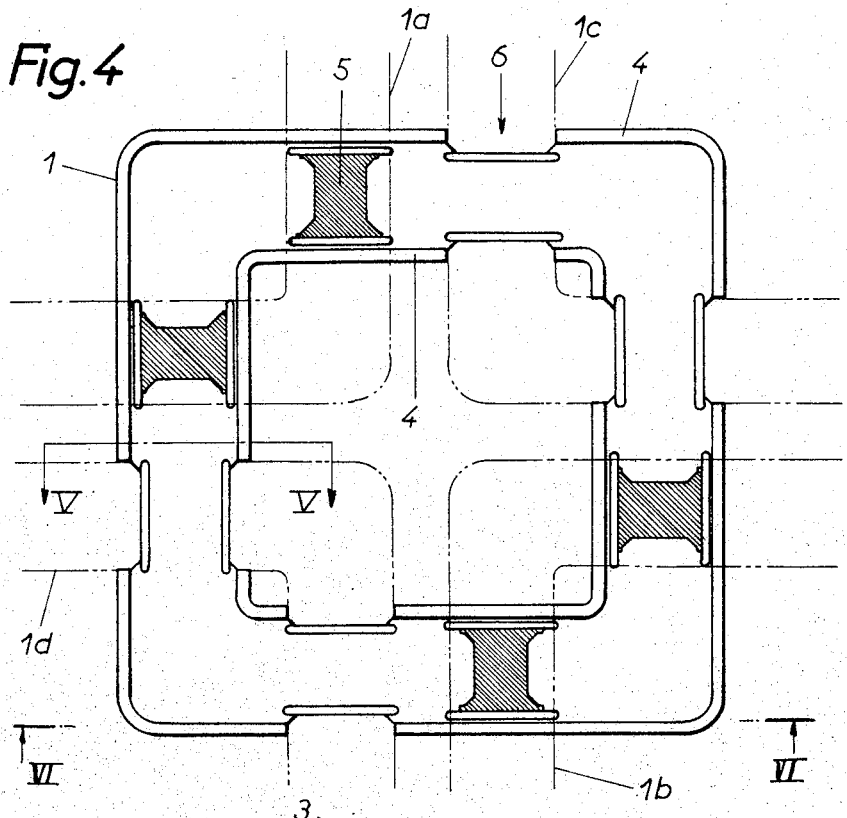
FIGURE 4 is a plan view corresponding to FIGURE 3.
Figure 5:
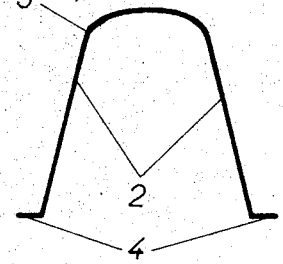
FIGURE 5 is a cross section, on a larger scale, taken substantially along the line V—V of FIGURE 4.
Figure 6:
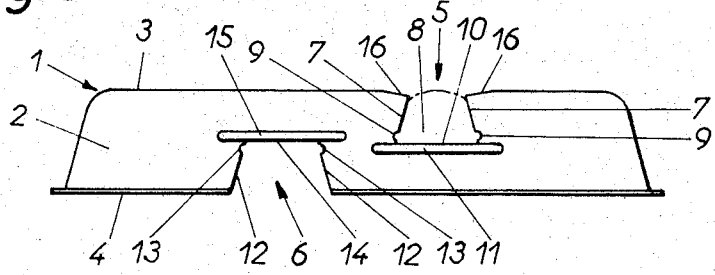
FIGURE 6 is an elevation taken substantially along the line VI—VI of FIGURE 4.
Figure 7:
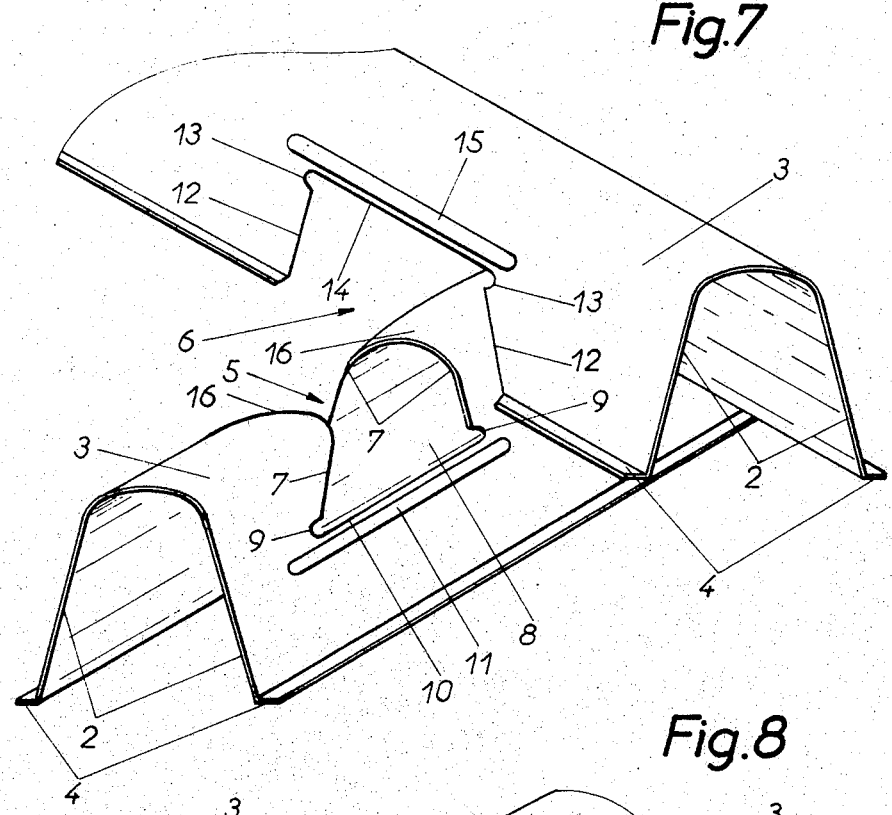
FIGURES 7 and 8 are partial perspectives showing certain details for positioning the elements.

As shown in FIGS. 3, 4 and 6, each ring has two series of upper and lower notches 5 and 6 respectively provided starting from the convex surface 3 and turned down edges 4 to extend for the same distance on each wall 2. These notches, formed during the moulding operation, are respectively defined in corresponding manner on either side and at an equal distance from two opposite corners, so that the angles of a ring alternatively have upper notches 5 and lower notches 6.

The upper notches 5 are defined by sloping edges 7, diverging from the surface 3 to provide a passage 8 appreciably corresponding to the cross size of the upper part of the U-section of each ring. These edges 7 are connected by concave scollops 9 to a horizontal edge 10 with a small bead 11 level with it projecting externally in relation to the corresponding wall 2. This small bead, of semi-cylindrical section, for example, extends for an appreciably greater length than that of the edge 10.

In like manner, the lower notches 6 are defined by converging edges 12 connected by concave scollops 13 to a horizontal edge 14 contiguous to a small bead 15. As can be seen in FIG. 6, it should be noticed that the upper and lower notches are so made that the scollops 9 and 13 extend at the same level as the corresponding small beads 15 and 11.

Figure 8:
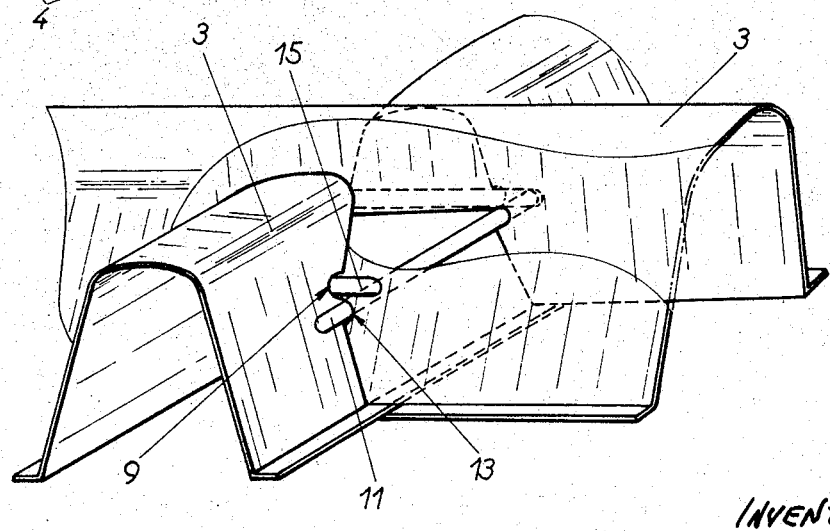

To ensure the making up of any kind of grid by means of the rings described above, one proceeds as follows:

A first ring 1 is laid flat so as to bear by the peripheric edges 4 on the surface to be covered. A second identical ring 1a is placed on the first one so that the lower notches 6 that it has on either side of its corners are placed facing the upper notches 5 of one of the corners of the basic ring 1. To ensure the overlapping of the corresponding parts, the operator elastically distorts, by pinching, the second ring so as to reduce the cross size of the area that must penetrate into the upper notches of the basic ring. Penetration may thus be ensured to obtain, as shown in FIG. 8, an insertion in which the small beads 11 and 15 are respectively engaged in the corresponding scollops 13 and 9 and owing to the elastic reaction of the material previously distorted. Thus, a kind of mutual locking is obtained, which efficacity can be increased by ensuring the engaging of the turned over edges 4 of the second ring 1a under the edges 4 of the basic ring 1. It should be noticed that the small beads 11 and 15 bear one on the other, which ensure perfect integration and enables a simultaneous distortion of these parts under the localised stress applied in the insertion area of the two rings.

As can be seen from FIG. 4, the securing of the second ring 1a is ensured in two orthogonal planes corresponding to slots provided on either side of each corner, so that this ring occupies a well defined position and cannot be subjected to side displacement except to the extent of the flexicon coefficient of the material of which it is made allows.

A third ring 1b can obviously be inserted in like manner in the upper notches of the opposite corner of the basic ring. Also, the latter can be overlapped in a similar manner by the lower notches that they have in the upper notches of the two other rings 1c and 1d. The same renewing operations can obviously take place as many times as a ring is to be placed for obtaining a grid like that partially digrammatised in FIGURE 2.

The grid thus formed behaves well on account of the mutual holding of the rings, as well as a certain vertical flexibility which makes its utilisation agreeable, especially in trays, gratings, shower baths and other similar applications. This flexibility is also useful when the covering grid is provided for forming an artificial sliding surface, for example, for ski practice, for it enables various movements to be made in a similar manner to those practised on a natural run. To this end, and although not shown, it may be advisable to provide on the convex surface 3, external projections whose line is chosen to afford a directional, non-slipping, etc., effect.

Whatever the application considered, but more particularly in the event of utilising the grid as an artificial sliding run, it has been found advantageous to provide on the convex surface 3 of each ring, clearances 16 made from the edges of the upper notches. As diagrammatised in broken lines in FIGURE 6, these clearances enable the presence of projecting corners to be avoided, which might interfere with sliding or lead to the forming of the beginning of breaks, reducing the life of each ring.

Figure 9:
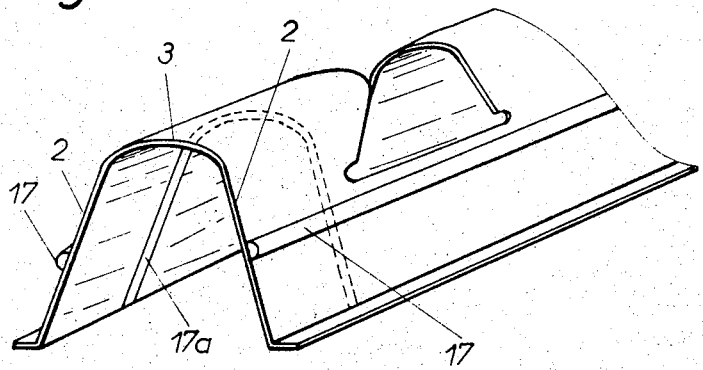
FIGURES 9 to 11 are partial perspectives showing various alternatives of embodying the elements.

In the particular application to the artificial ski run, it may be advisable to make the rings so that they have greater rigidity to flexion for absorbing considerable stresses which are applied, for example, on turns, in skidding, etc. In such case, this rigidity is conferred, as shown in FIG. 9, by a peripherical ribbing 17 formed to project on the walls 2 to extend level with the small beads 11 and 15 normally bordering the upper and lower notches. It is obvious that in such case, the ribbing 17 is alternately provided at different planes successively corresponding to the horizontal level of the small beads 11 and 15. To still further increase rigidity, each ring can also comprise, in addition to the ribs 17, internal cross ribbing 17a of arch shape provided at regular spaces on the whole extent of the walls 2 and the upper convex surface 3.

Figure 10:
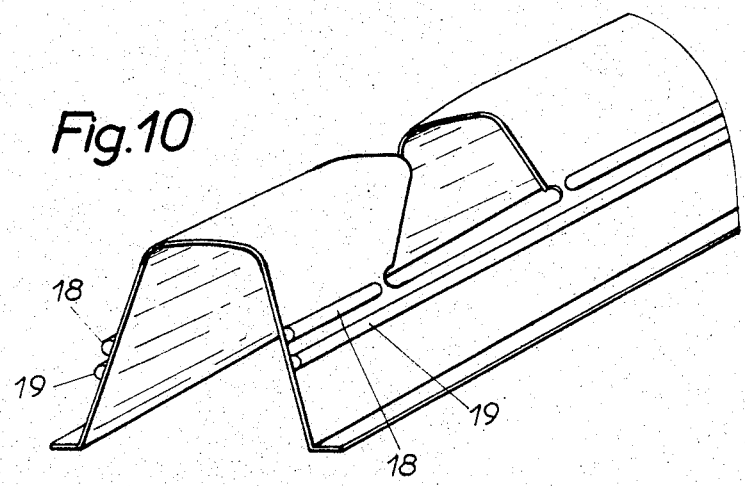

An alternative embodiment is shown in FIG. 10, according to which each wall 2 comprises two parallel peripherical ribs 18 and 19 respectively extending at a horizontal level to the small beads 11 and 15. These ribs are alternately broken off by the concave scollops of each upper or lower notch to enable the engaging of the corresponding rib of another ring that is being inserted.

Figure 11:
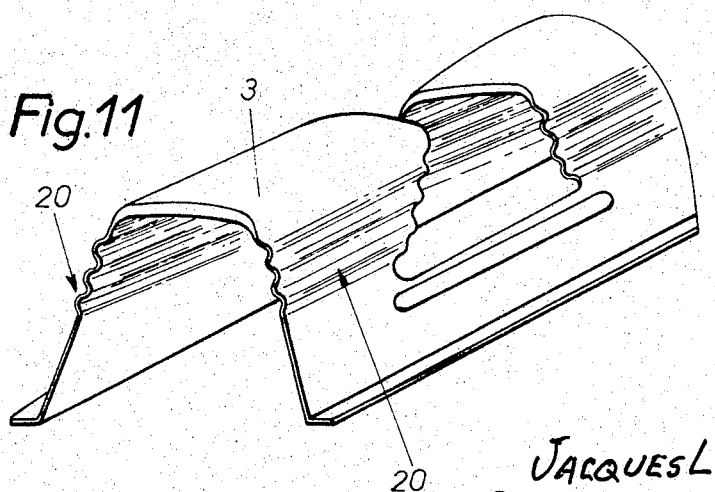

FIGURE 11 shows another example of embodiment in which the walls 2 form two peripheric vestibules 20 intended to impart better flexibility to the upper part of each ring. In this example, it may also be advantageous to make the surface convex 3 so that it has an appreciably greater thickness than the walls 2 to impart sound rigidity to it, as well as greater resistance to wear.

The invention is not restricted to the examples of embodiment shown and described in detail, for various modifications can be applied to it without going outside of its scope. In particular, the rings can have a shape different to that shown in the drawings, more particularly, a circular shape.

I claim:
1. A grid for runways comprising
   a plurality of resilient ring elements, each of identical form, and said elements being in interlocked relationship,
   each of said ring elements having spaced pairs of recesses in the upper surface alternating with spaced pairs of recesses in the lower surface,
   a bead along the base of each recess and a notch in each side of the respective recesses,
   said rings being interfiitted with the lower recesses interfitting with upper recesses and the notches receiving the beads in snap fit relation.
2. The grid as defined in claim 1 wherein said beads extend continuously between the upper and lower recesses.
3. The grid as defined in claim 1 wherein each ring is of inverted U-shape in cross section providing upwardly convergent side walls joined by an upper convex wall, said upper wall being depressed on opposite sides of each upper recess.
4. The grid as defined in claim 1 wherein each ring is of inverted U-shape in cross section providing upwardly convergent side walls joined by an upper convex wall, said side walls being peripherally corrugated.
5. The grid as defined in claim 1 wherein each ring is of inverted U-shape in cross section providing upwardly convergent side walls joined by an upper convex wall, and internal reinforcing ribs on the inner surfaces of said walls and upper surface.
6. The grid according to claim 1, characterized in that each ring is of quadrilateral shape having an inverted U-section defined by two peripheral walls converging towards an upper convex surface, each wall having an outwardly directed lower edge.
7. The grid according to claim 1, characterized in that each ring is of quadrilateral shape, said recesses being disposed symmetricallp at the corners of each ring.

References Cited
UNITED STATES PATENTS

| | | | |
|---|---|---|---|
| 2,025,815 | 12/1935 | Horridge | 94—13 |
| 2,047,119 | 7/1936 | Storace | 94—8 |
| 2,179,019 | 11/1939 | Willets | 94—8 |
| 2,995,224 | 8/1961 | Butler et al. | 52—663 |
| 3,256,785 | 6/1966 | Stammbach et al. | 94—13 |

JACOB L. NACKENOFF, *Primary Examiner.*